United States Patent
Thangyah

(10) Patent No.: US 11,171,589 B2
(45) Date of Patent: Nov. 9, 2021

(54) SYSTEMS AND METHODS FOR STARTING STEAM TURBINES

(71) Applicant: Mitsubishi Power Americas, Inc., Lake Mary, FL (US)

(72) Inventor: Schwartz Thangyah, Sanford, FL (US)

(73) Assignee: Mitsubishi Power Americas, Inc., Lake Mary, FL (US)

( * ) Notice: Subject to any disclaimer, the term of this patent is extended or adjusted under 35 U.S.C. 154(b) by 0 days.

(21) Appl. No.: 16/689,308

(22) Filed: Nov. 20, 2019

(65) Prior Publication Data

US 2021/0152109 A1    May 20, 2021

(51) Int. Cl.
    *H02P 9/00*    (2006.01)
    *H02P 9/08*    (2006.01)
    *H02P 101/20*    (2015.01)

(52) U.S. Cl.
    CPC ............ *H02P 9/08* (2013.01); *H02P 2101/20* (2015.01)

(58) Field of Classification Search
CPC ........ H02P 9/08; H02P 2101/20; F01D 19/00; F02C 6/04
See application file for complete search history.

(56) References Cited

U.S. PATENT DOCUMENTS

| | | | | |
|---|---|---|---|---|
| 4,031,404 A | * | 6/1977 | Martz | F01K 23/108 290/40 R |
| 5,783,932 A | * | 7/1998 | Namba | H02J 9/066 322/16 |
| 2011/0018265 A1 | * | 1/2011 | Hoffmann | F01K 13/02 290/7 |

* cited by examiner

*Primary Examiner* — Julio C. Gonzalez
(74) *Attorney, Agent, or Firm* — Schwegman Lundberg & Woessner, P.A.

(57) ABSTRACT

A method for starting a steam turbine can comprise electrically decoupling a generator configured to be driven by the steam turbine from a power supply, controlling power from the power supply to a frequency converter, and operating the generator as a starter motor with power from the frequency converter to turn the steam turbine. A power plant system can comprise a steam turbine, a generator configured to be driven by the steam turbine to supply power to a grid system, a first switch to electrically couple and decouple the generator from the grid system, a frequency converter electrically coupled to the generator, and a second switch to electrically couple and decouple the frequency converter form the grid system.

10 Claims, 6 Drawing Sheets

SYSTEMS AND METHODS FOR STARTING STEAM TURBINES

TECHNICAL FIELD

This document pertains generally, but not by way of limitation, to systems and methods for starting steam turbines. More specifically, but not by way of limitation, the present application relates to systems and methods for starting steam turbines using power from a grid system ("the grid") to drive an electrical generator as a starter motor.

BACKGROUND

Power plants typically supply power to a grid system within a distributed network where voltage is provided at a constant amplitude or magnitude. The grid system is managed to maintain frequency regulation, such as at a control frequency of, for example, 60 Hertz (Hz), so that the frequency and voltage magnitude maintain stability across a broad range of power input and load, or demand conditions. Each power plant can separately provide power to the grid system using a controlled frequency that can coincide with the control frequency. Put another way, each power plant is expected to contribute power to meet the demand such that the grid system balances power supply and demand.

In some scenarios, it can be desirable to rapidly bring additional power on-line from additional power plants not previously operating in order to meet demand that cannot be met by already on-line power plants. In some power plants, electricity from the grid can be used to bring the power plant on-line before electricity production can take place. For example, electricity can be used to operate an electrical generator as a starter-motor to spin up a gas turbine engine. Frequency converters, such as static frequency converters (SFCs) or load commutated inverter (Leis) are typically selected to provide a desired acceleration rate of increasing RPM per second to drive the generator and subsequently the gas turbine.

Recent trends include a desire by power plant operators to reduce (i.e., have faster) turbine starting times, in order to be more responsive to requests from the grid to, for example, increase power output, which can result from increased use and unpredictability of renewable power sources. However, not all types of power plants, such as combined-cycle power plants, are conducive to fast start operations. Fast starts can be economically advantageous to grid operators to facilitate allocation of power based on changing grid needs to maintain or allow for efficient energy production.

Examples of combined-cycle power plants using inverters or converters are described in U.S. Pat. No. 5,783,932 to Namba et al.; Pub. No. US 2005/0225302 to Herzog et al.; and Pub. No. US 2015/0377140 to Rittenhouse et al.

OVERVIEW

The present inventor has recognized, among other things, that problems to be solved in starting gas turbine engine systems include the added time that can be incurred in starting a steam turbine, such as those used in combined-cycle power plants. Thus, even if the gas turbine engines are equipped with frequency converters, power plant operators typically must wait for the steam turbine to come on-line. The steam turbine is driven by gas, e.g., steam, generated by a Heat Recovery Steam Generator (HRSG) with heat from the gas turbine engines. In order for the steam turbine to operate, the gas turbines must first be brought up to speed and temperature and the HRSG must secondly be brought up to temperature. Finally, the steam turbine itself must be brought up to temperature before sustaining independent operation.

The present subject matter can provide solutions to this problem and other problems, such as by providing methods and systems for starting a steam turbine independent of operation of the gas turbines and the MSG. In particular, the steam turbine can be provided with a frequency converter to drive the steam turbine, via the electrical generator operating as a starter-motor, before the HRSG is prepared to operate the steam turbine. The electrical generator can additionally be operated as a motor during shut-down of the steam turbine to provide spin cooling, with suitable design provisions. Operation of the steam turbine before operation of the HRSG can additionally be facilitated with an auxiliary boiler that can provide additional functions, such as air-churn cooling, gland sealing and heat soaking.

In an example, a method for starting a steam turbine can comprise electrically decoupling a generator configured to be driven by the steam turbine from a power supply, controlling power from the power supply to a frequency converter, and operating the generator as a starter motor with power from the frequency converter to turn the steam turbine.

In another example, a power plant system can comprise a steam turbine, a generator configured to be driven by the steam turbine to supply power to a grid system, a first switch to electrically couple and decouple the generator from the grid system, a frequency converter electrically coupled to the generator, and a second switch to electrically couple and decouple the frequency converter form the grid system.

This overview is intended to provide an overview of subject matter of the present patent application. It is not intended to provide an exclusive or exhaustive explanation of the invention. The detailed description is included to provide further information about the present patent application.

Figure 1:
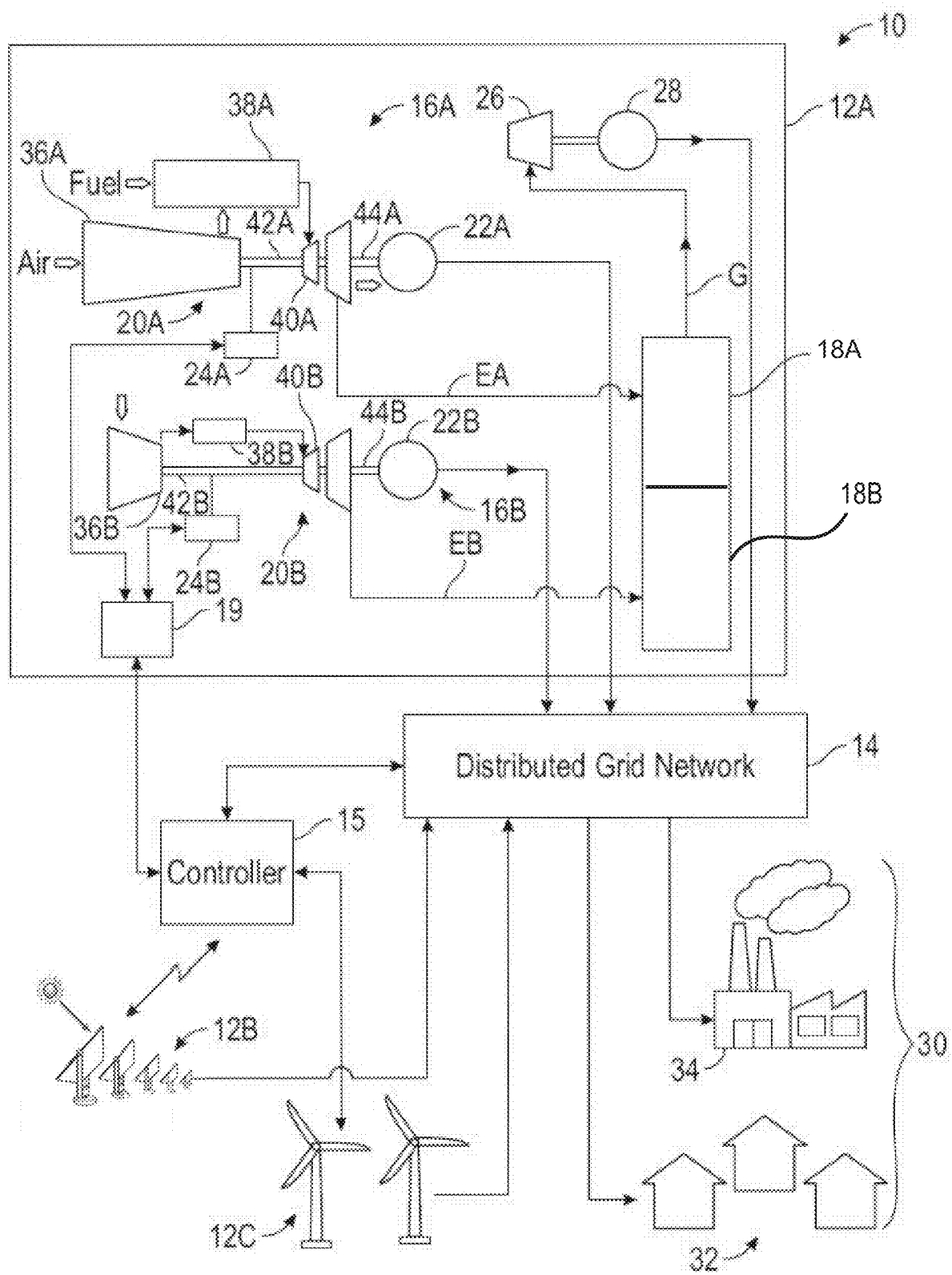
FIG. 1 is a schematic diagram of a power system illustrating multiple power plants configured to provide electrical power to a distributed grid network (DGN) or "grid."

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

FIG. 1 is a schematic diagram of power system 10 illustrating power plant 12A, power plant 112B and power plant 12C providing electrical power to distributed grid network (DGN) or "grid" 14, which can include controller 15. First power plant 12A can include first generator unit 16A, second generator unit 16B, heat recovery steam generators (HRSGs) 18A and 18B, and controller 19. Generator units 16A, 16B can comprise gas turbines 20A 20B, electrical generator 22A, 22B and engine controllers 24A, 24B, such as a Distributed Control Systems (DCS) devices. HRSGs 18A and 18B can be operatively coupled to steam turbine 26, which can be connected to electrical generator 28. HRSGs 18A and 18B are illustrated as sharing a common steam path. However, exhaust gas from gas turbine 20A can be used to generate a first stream of gas G and exhaust gas from gas turbine 20B can be used to generate a second stream of gas G that can be combined at some point before entering steam turbine 26. In additional examples, steam from HRSG 18A and HRSG 18B can be used to drive different stages (e.g., low pressure, intermediate pressure, high pressure) of steam turbine 26. DGN 14 can be configured to deliver power from electrical generators 22A, 22B and 28 to end users 30, which can include residential housing units 32 and factory 34, for example.

As is known in the art, gas turbines 20A and 20B operate by compressing air with a compressor and burning fuel within the compressed air to generate high energy gases that pass through a turbine that produces rotational shaft power to drive an electrical generator. Gas turbines 20A, 20B can include compressors 36A, 36B, combustors 38A, 38B turbines 40A, 40B, turbine shafts 42A, 42B and output shafts 44A, 44B. Engine controllers 24A and 24B can control the amount of fuel that is delivered to combustors 38A and 38B, thereby controlling the power output of gas turbines 20A and 20B. In some non-limiting examples of embodiments of the present application, gas turbines 20A and 20B are constructed in the same manner, e.g., are the same model or have the same capacity.

Exhaust gas EA and EB of gas turbines 20A and 20B, respectively, can be directed to HRSGs 18A and 18B. HRSGs 18A and 18B can utilize hot exhaust gas EA and EB to produce gas G, such as steam, for driving steam turbine 26.

Figure 3:
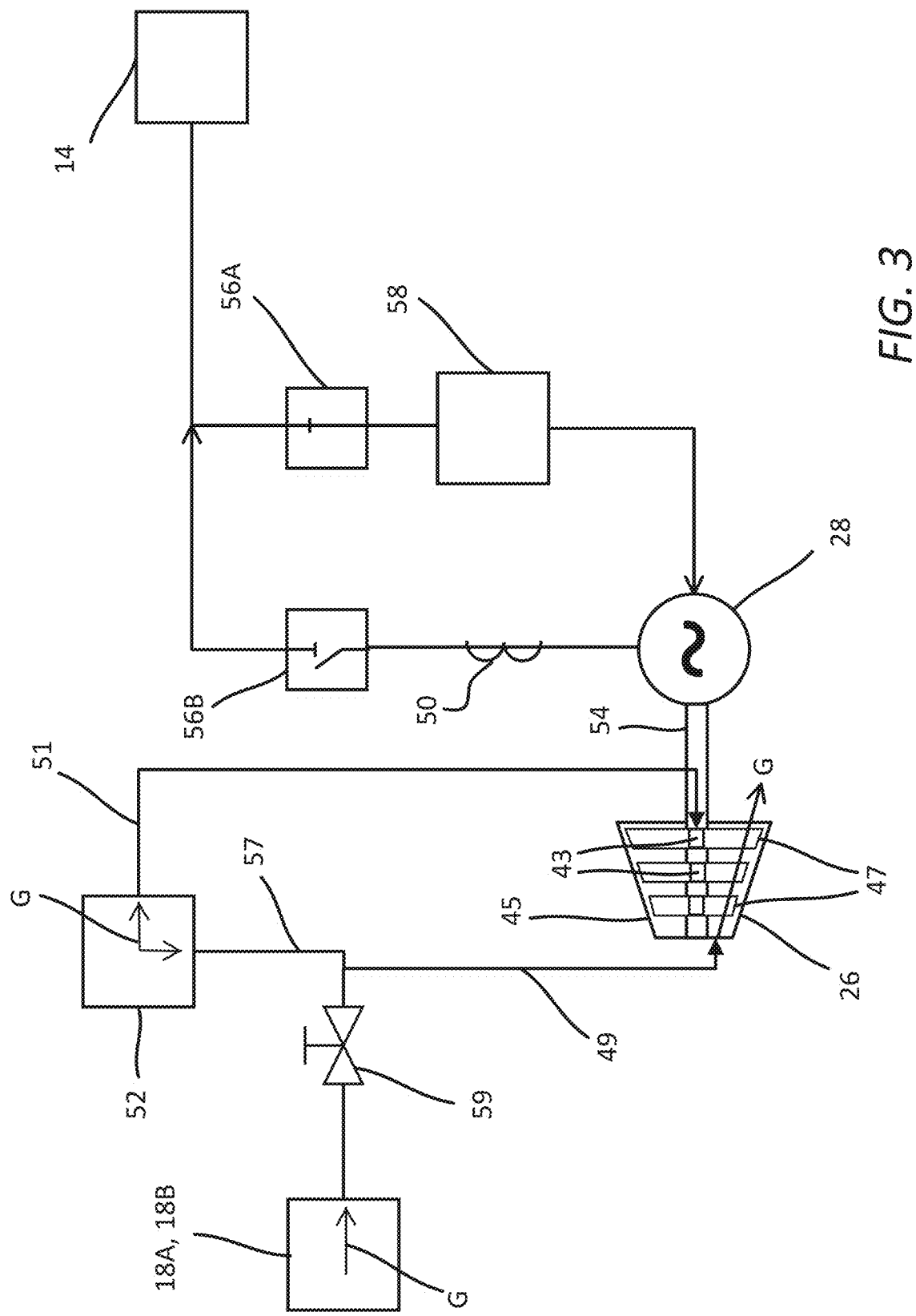
FIG. 3 is a schematic diagram illustrating of the steam generator of FIG. 2 additionally coupled to the grid system via switches and a frequency converter.

Electrical output of generators 22A and 22B and electrical generator 28 can be provided to DGN 14. Controller 19 can interface with engine controllers 24A and 24B to control generator units 16A and 16B to provide power to DGN 14 to, among other things, correct load and supply imbalance. Power plant controller 19 can coordinate with engine controllers 24A and 24B to bring steam turbine 26 on-line in a coordinated manner. For example, controller 19 can control release of gas G from HRSGs 18A and 18B to steam turbine 26 when the gas has reached the desired state, e.g., temperature. Additionally, though not illustrated in FIG. 1, controller 19 can communicate directly with components of steam turbine 26, such as switches 56A and 56B, frequency converter 58 and shut-off valve 59, which are illustrated in FIG. 3.

The present disclosure is directed to systems and methods for controlling operation of steam turbine 26, particularly during start-up operations. End users 30, or consumers or customers, typically operate within a reasonably predictable operating band for any point in time such that small changes in the total power demand do not produce significant changes in the operation of power plants 12A, 12B and 12C. However, sometimes load imbalances can be produced if the total load demand rapidly changes, either upward or downward. During load imbalance situations, such as when another power plant, such as one of power plants 12B or 12C goes off-line, particularly in a sudden fashion, or when factory 34 goes on-line, particularly in a sudden fashion, it can be desirable to bring power plant 12A on-line in a rapid manner. In other scenarios, it can be desirable to bring power plant 12A on-line rapidly when conditions arise that can lead to loss of power or reduced power from wind turbine power plants or solar power plants. In order to bring steam turbine 2.6 up to speed quickly, electrical generator 28 can be coupled to grid 14 using a frequency converter 58 (FIG. 3) such that electrical generator 28 can be driven as a starter-motor to spin steam turbine 26, thereby reducing the time to bring steam turbine 26, and power plant 12A, up to operation using only steam from HRSGs 18A and 18B.

Figure 2:
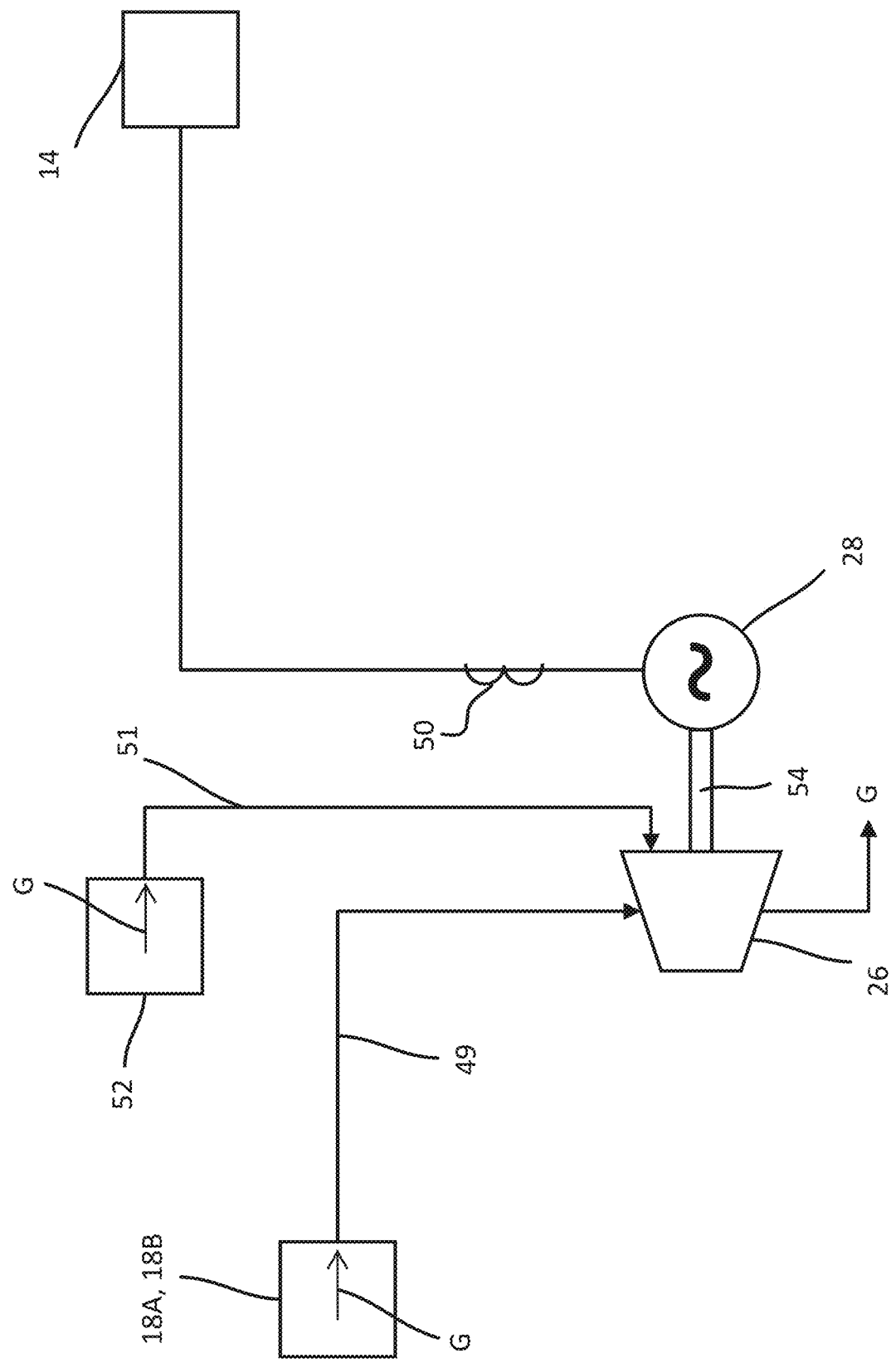
FIG. 2 is a schematic diagram of a steam turbine connected to a heat recovery steam generator and an auxiliary steam source.

FIG. 2 is a schematic diagram illustrating steam turbine 26 and electrical generator 28 of FIG. 1 connected to grid 14 via transformer 50. Steam turbine 26 can additionally receive gas G from HRSGs 18A and 18B and auxiliary boiler 52.

During a cold start-up mode in a combined-cycle plant, such as that of power plant 12A, gas turbines 20A and 20B can be started first. Gas G, such as steam, from HRSGs 18A and 18B can be allowed into steam turbine 2.6 via line 49 after gas G reaches some minimum conditions. Gas G can be directed across turbine blades of steam turbine 26 to produce rotation of shaft 54. As gas G is admitted into steam turbine 26, the speed of steam turbine shaft 54 increases from 0 rpm to a rated rpm. During the acceleration period of steam turbine 26, a rub check can be done at around 400 rpm. A rub check can be conducted to determine if outer tips of the turbine blades of steam turbine 26 are inappropriately rubbing against or engaging the casing structure surrounding the turbine blades, If inspection reveals inappropriate contact or rubbing, the blades can be checked to determine proper seating and wear conditions and appropriate corrective action can be taken.

Once rated speed is achieved (and before steam turbine 26 is loaded by connecting to grid 14), rotors of steam turbine 26 can undergo a heat soak to minimize thermal shock. Steam for the heat soak can be provided by auxiliary boiler 52 via line 51. The heat soak steam can additionally be directed into the inner diameter portions of the turbine blades to provide heated moisture for activating gland seals. in example steam turbines 26, the gland seals can comprise labyrinth seals.

Figure 5:
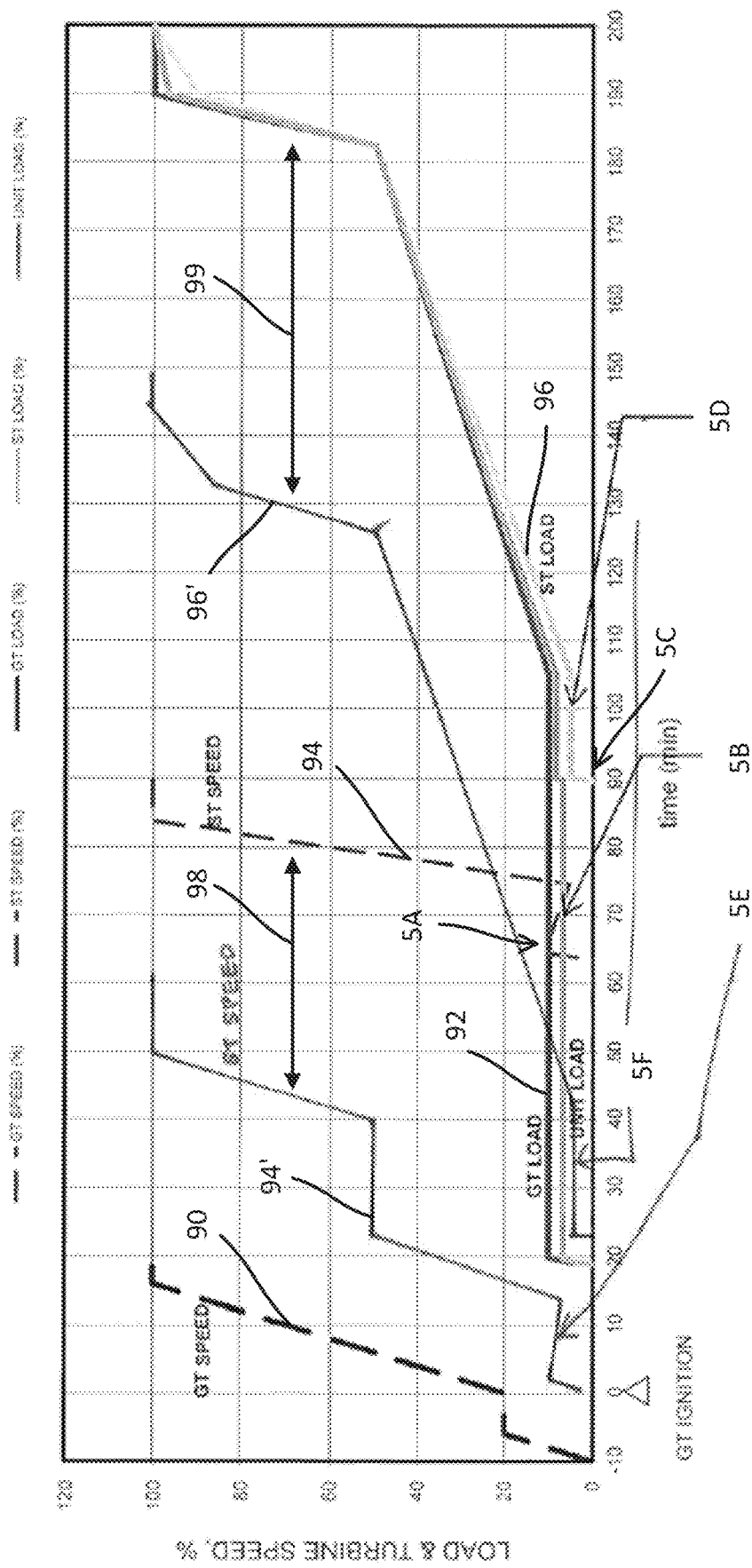
FIG. 5 is a schematic diagram illustrating start-up curves for a gas turbine and a steam turbine with and without fast-start capabilities of the present disclosure.

It may take time for gas G to achieve appropriate conditions, (e.g., temperature, pressure, etc.) suitable for operation of steam turbine 26 because it takes time for gas turbines 20A and 20B to achieve operating parameters as input to HRSGS 18A and 18B. Rub checks and heat soaking activities take additional time even after gas G is provided to steam turbine 26. For example, as can be seen in FIG. 5, steam turbine loading on curve 96 begins to ramp-up after a rub check has been performed at point 5B on curve 94 and a heat soak has been performed at point 5D on curve 96. As such, there can be significant delay in achieving the rated output from steam turbine 26 and, therefore, the efficiency of bringing the entire power plant 12A on-line can be delayed. Thus, the ability of power plant 12A to rapidly meet changing grid conditions can be hindered.

Reducing start-up time during a cold start mode is advantageous in that full power output from steam turbine 26 can be achieved at an earlier time. Additionally, reducing start-up time allows loading gas turbines 20A and 20B sooner, which will reduce start-up emissions from gas turbines 20A and 20B. The present disclosure can improve, i.e., decrease, start-up times for power plants, particularly steam turbine start-up times, by providing a start system for the steam turbine that is independent of gas generation by the gas turbine engines and the HRSG(s). For example, steam turbine 26 can be provided with a motor to turn shaft 54. Furthermore, the motor can be in the form of using electrical generator 28 as a starter-motor. Still further, electrical generator 28 can be provided with electricity from grid 14 by using frequency converter 58 (FIG. 3) to convert alternating current of grid 14 to a frequency compatible with electrical generator 28.

FIG. 3 is a schematic diagram illustrating steam turbine 26 of FIG. 2 coupled to grid 14 via switch 56A and frequency converter 58, in addition to switch 56B and transformer 50. HRSGs 18A and 18B can be provided with shut-off valve 59.

When steam turbine 26 is operating, switch 56B can be closed such that electricity generated by electrical generator 28 can flow to grid 14. The electricity first is directed through transformer 50, which can convert the electricity to voltages compatible with grid 14. In such operating conditions, switch 56A can be opened such that current does not flow through frequency converter 58. When steam turbine 26 is not operating, such as during evening (e.g., nighttime) or grid conditions where power demand is low, switches 56A and 56B can be open. Steam turbine 26 can be shut down to a non-operating condition where gas G is not being provided to steam turbine 26.

Switches 56A and 56B can comprise any suitable device for opening and closing an electrical connection, such as a breaker and the like. Switches 56A and 56B can be configured to be remotely operated via electrical actuation, such as from controller 19.

When grid controller 15 (FIG. 1) instructs power plant 12A (FIG. 1) to come on-line, switch 56A can be closed (as illustrated in FIG. 3) to connect frequency converter 58 to grid 14, and electrical generator 28 can function as a starter-motor for starting steam turbine 26. Thus, under power from grid 14, electrical generator 28 can provide a mechanical input to shaft 54.

Frequency converter 58 can be configured to receive power from grid 14 at a fixed frequency and match the frequency to generator 28 as it spins up through various speeds from a very low speed to a high speed. In an example, generator 28 can begin at a low speed of approximately three revolutions per minute (RPM) to a high speed of approximately 3,600 RPM. In an example, electrical generator 26 and frequency converter 58 can be used to ramp steam turbine 26 up to 50% of rated speed, e.g., 1,800 RPM in order to perform heat soak of steam turbine or to wait for any HRSG part to warm up. Frequency converter 58 can comprise any suitable device for providing such functionality, such as a static frequency converter (SFC) or a load commutated inverter (LCI). Frequency converter 58 can be sized for the configuration of steam turbine and electrical generator to which it is connected. In an example, frequency converter 58 is sized to provide 30 megawatts of capacity. Frequency converter 58 can be sized to increase the rate of rotation of steam turbine 26 at a desired rate via generator 28. Frequency converter 58 can be sized for the fastest start rate at which steam turbine 26 is constructed or intended to accommodate. However, fast starts are in general more costly to initiate than slower starts due to increased wear on the components of steam turbine 26 and associated pumps and motors. In another example, frequency converter 58 can be a frequency converter available to one or both of gas turbines 20A and 20B used to start said gas turbines, rather than a dedicated frequency converter for steam turbine 26.

After electrical generator 28 begins to spin shaft 54, a rub check can be conducted to check alignment of turbine blades 47 with turbine case 45. For example, a rub check can be conducted at approximately 400 RPM, as shown by point 5E on curve 94' of FIG. 5.

A heat soak can be performed using auxiliary boiler 52 and lines 57 and 49, and steam can be provided to steam turbine 26 via line 51, as discussed above, to perform gland sealing of gland seals 43. Additional lines can be provided to direct steam to particular portions or areas of steam turbine 26 to perform various functions. Valve 59 can be controlled during start-up procedures. For example, valve 59 can be closed until HRSGs 18A and 18B are prepared to produce steam for steam turbine 26. Valve 59 can comprise any suitable valve of valve system for controlling gas, such as steam, flow. In examples, valve 59 can be remotely operated and thus can include appropriate electronics for interacting with controller 19.

Electrical generator 28 can continue to spin steam turbine 26 until gas turbines 20A and 20B are operating at a level that will permit HRSGs 18A and 18B to produce gas sufficient to maintain rotation and/or operation of steam turbine 26. Steam from auxiliary boiler 52 can also be used to cool steam turbine 26 during cranking by electrical generator 28 to offset effects of air being churned within steam turbine 26. When the steam turbine 26 is properly prepared to be loaded and generate electricity, such as via steam provided by HRSGs 18A and 18B through line 49, switch 56A can be opened to decouple frequency converter 58 from grid 14. As such, electrical generator 28 will cease to provide mechanical input to shaft 54. Steam from HRSGs 18A and 18B (and/or auxiliary boiler 52) directed into steam turbine 26 will then rotate shaft 54 to drive electrical generator 28 as an electrical generator. Thereafter, switch 56B can be closed to provide power to grid 14, During shut-down procedures, switch 56B can be opened to no longer provide power to grid 14, while switch 56A remains open. For example, frequency converter 58 and electrical generator 28 can be used to drive steam turbine 26 through a spin cooling procedure. Electrical generator 28 can be used to spin steam turbine 26 at an appropriate rate to slowly cool down steam turbine 26 to ambient conditions.

Figure 4:
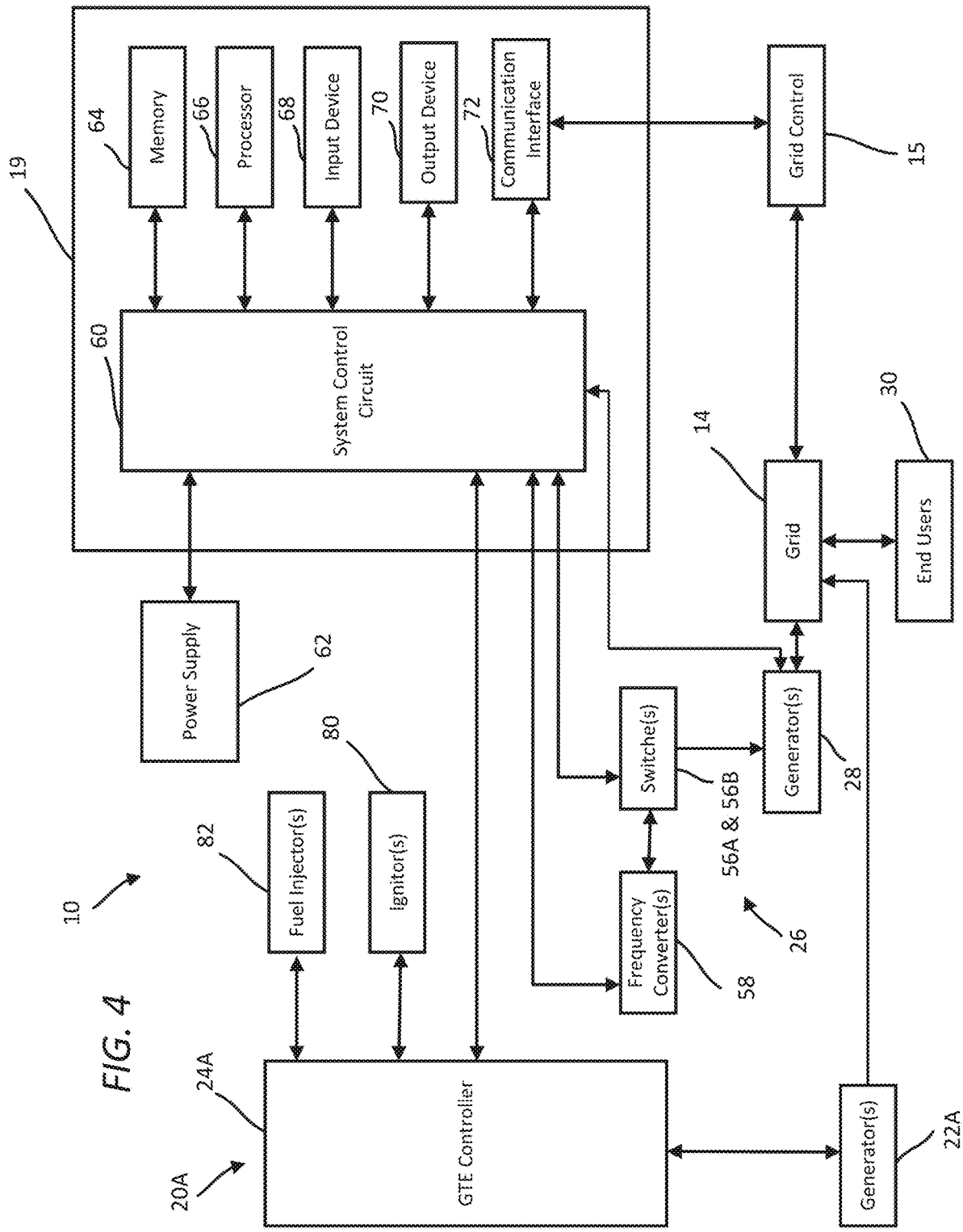
FIG. 4 is a schematic diagram illustrating a control system architecture for the power system of FIG. 1.

FIG. 4 is a schematic diagram illustrating components of power plant controller 19 and engine controller 24A for operating gas turbine 20A and steam turbine 26 of FIG. 3. Controller 19 can include circuit 60, power supply 62, memory 64, processor 66, input device 68, output device 70 and communication interface 72. Controller 19 can be in communication with grid controller 15, which can provide power to end users 30 via grid 14. Controller 19 can also be in communication with gas turbine engine controller 24A. Engine controller 24A can be in communication with gas turbine 20A to control operation of gas turbine 20A. For example, engine controller 24A can be configured to control the combustion process in combustor 38A, which can alter the power output of gas turbine 20A and the flow of exhaust gas 1. To that end, engine controller 24A can be configured to operate one or more ignitors 80 and fuel injectors 82 Engine controller 24B can be configured similarly as engine controller 24A to operate gas turbine 20B. Power plant controller 19 can be configured to control and coordinate all of the operations of power plant 12, including operation of steam turbine 26 by operating switches 56A and 56B, frequency converter 58, and valve 59 for steam turbine 26.

Grid controller 15, power plant controller 19 and engine controller 24A can also include various computer system components that facilitate receiving and issuing electronic instructions, storing instructions, data and information, communicating with other devices, display devices, input devices, output devices and the like. Specifics of plant controller 19 are provided herein. However, further descriptions of grid controller 15 and engine controller 24A are omitted here for brevity. Grid controller 15, engine controller 24A and engine controller 24B can include similar hardware components as power plant controller 19.

Circuit 60 can comprise any suitable computer architecture such as microprocessors, chips and the like that allow memory 64, processor 66, input device 68, output device 70 and communication interface 72 to operate together. Power supply 62 can comprise any suitable method for providing electrical power to controller 19, such as AC or DC power supplies. Memory 64 can comprise any suitable memory device, such as random access memory, read only memory, flash memory, magnetic memory and optical memory, Input device 68 can comprise a keyboard, mouse, pointer, touch-screen and other suitable devices for providing a user input or other input to circuit 60 or memory 64. Output device 70 can comprise a display monitor, a viewing screen, a touch screen, a printer, a projector, an audio speaker and the like. Communication interface 72 can comprise devices for allowing circuit 60 and controller 19 to receive information from and transmit information to other computing devices, such as a modem, a router, an I/O interface, a bus, a local area network, a wide area network, the interne and the like.

Controller 15 can be configured to operate grid 14 and, as such, can be referred to the "home office" for power system 10. Grid 14 can comprise power plants 12A, 12B and 12C, high voltage transmission lines that carry power from distant sources to demand centers, and distribution lines that connect end users 30.

Controller 15 can determine the demand being placed on grid 14, such as by monitoring the consumption of end users 30 and ensure that the total power generated by power plants 12A, 12B and 12C meets the power demand of end users 30. If power demand of end users 30 exceeds or is less than power supplied by power plants 12A, 12B and 12C, controller 15 can dictate response strategies for each of power plants 12A, 12B and 12C. For example, in the event of a power demand increase that exceeds the predicted operating band, controller 15 can ensure that each of power plants 12A, 12B and 12C responds so that only one or less than all of the power plants is prevented from bearing the burden of generating power for the deficiency. Likewise, controller 15 can instruct any or all of power plants 12A, 12B and 12C to come on-line or go off-line as needed, or via a predetermined schedule, to meet power demands. Thus, controller 15 can interface with a power plant controller for each of power plants 12A, 12B and 12C, like controller 19 for power plant 12A.

Controller 19 can be configured to operate power plant 12A. As mentioned, power plants 12B and 12C can be configured to operate with similar controllers as controller 19, but illustration and description is omitted. Circuit 60 can communicate with, that is, read from and write to, a memory device such as memory 64. Memory 64 can include various computer readable instructions for implementing operation of power plant 12A and generator units 16A and 16B (FIG. 1). Thus, memory 64 can include instructions for monitoring requests from grid controller 15, Circuit 60 can be connected to various sensors to perform such functions. Memory 64 can also include information that can assist controller 19 in providing instruction to turbine controllers 24A and 24B. For example, memory 64 can include the type, size (capacity), age, maintenance history of gas turbines 20A and 20B, steam turbine 26 and power plant 12A, Memory 64 can include various computer readable instructions for implementing operation of power plant 12A. Thus, memory 64 can include instructions for monitoring a power generation assignment from controller 15, instructions for power generation for engine controllers 24A and 24B, imbalance responses for each of generator units 16A and 16B, start-up instructions (e.g., RPM ramp rates for starts and associated instructions for components of gas turbines 20A and 20B and steam turbine 26, such as ignitors 80, fuel injectors 82, valve 59, switches 56A and 56B, and the like). Memory for engine controllers 24A and 24B can additionally be provided with instructions for operating gas turbines 20A and 20B, such as start and stop instructions.

Controller 19 can receive notifications of changes in steady state operation of power system 10 from controller 15. Controller 19 can also receive instructions from controller 15 to go off-line or come on-line to meet power demands.

In response to receiving instructions from controller 15 to meet power demands, controller 19 can issue instructions to, and receive inputs from engine controllers 24A and 24B of gas turbines 20A and 20B. For example, controller 19 can issue start and stop command signals to engine controllers 24A and 24B, as well as commands to switches 56A and 56B and valve 59 to control steam turbine 26. Engine controllers 24A and 24B can thus issue start and stop instructions to components of gas turbines 20A and 20B, such as fuel injectors 82 and ignitors 80. Additionally, instructions for a start and stop operations can be manually entered at a control panel, such as at an input device that includes a menu of start options, for each of gas turbines 20A and 20B and steam turbine 26. After starting of gas turbines 20A and 20B, engine controllers 24A and 24B can increase or decrease the power output by controlling the combustion process, such as by providing more or less fuel to combustors 38A and 38B with injectors 82. Controller 19 can coordinate operation of steam turbine 26 based on the current operating conditions of gas turbines 20A and 20B and HRSGs 18A and 18B to operate steam turbine 26, as well as to operate steam turbine 26 with fast start capabilities using switches 56A and 56B, frequency converter 58 and valve 59.

FIG. 5 is a schematic diagram illustrating start-up curves for a gas turbine and a steam turbine. FIG. 5 shows time along the x-axis and load and speed percentage along the y-axis. Curve 90 indicates speed for a gas turbine, such as one or both of gas turbines 20A and 20B. Curve 92 indicates load on the gas turbine of curve 90. Curve 94 indicates speed of a steam turbine, such as steam turbine 26, being driven by gas generated by the gas turbine of curve 90. Curve 96 indicates the load on the steam turbine of curve 94. Curve 94' indicates speed of a steam turbine, such as steam turbine 26, in accordance with embodiments of the present disclosure. The steam turbine 26 represented by curve 94' is driven by an electrical generator, such as electrical generator 28, driven as a starter-motor with a frequency converter, such as frequency converter 58, as well as gas generated by the gas turbine of curve 90. Curve 96' indicates the load on the steam turbine curve 94'.

As can be seen by curve 90, gas turbine 20A, 20B speed is brought up to 100% in a short period of time at a point in time much earlier than the speed of steam turbine 26 is brought up to 100%, as shown in curve 94. Gas turbine 20A, 20B is brought up to speed independently based on the capabilities of the gas turbine. However, steam turbine 26 is brought up to speed dependent on gas turbine 20A, 20B. As shown at point 5A on curve 94, steam turbine 26 typically does not begin to operate until sometime after gas turbine 20A, 20B has begun loading. The time for steam turbine 26 to begin operating is delayed by the desire to perform a rub check at point 5B. The rub check can be performed at approximately 400 RPM to verify that blades of steam turbine 26 are not rubbing against the steam turbine casing due to misalignment, etc. Point 5C, viewed in conjunction with curves 94 and 96, illustrates that steam turbine 26 does not begin to be loaded until sometime after steam turbine 26 is brought up to 100% speed, which is well after gas turbine 20A, 20B has been operating under load for a period of time, which can result in high emissions due to gas turbine 20A, 20B being operated below its most efficient operating point near full load. Further loading of the steam turbine 26 is delayed by the performance of a heat soak at point 5D. The heat soak is typically performed to introduce steam into steam turbine 26 to bring the steam turbine material up to temperature and/or to perform gland sealing. Thereafter, gas turbine 20A, 20B and steam turbine 26 can be brought up to 100% load. As can be seen, loading of the power plant is significantly delayed by the long ramp up time of the HRSG in order to generate steam for steam turbine 26 to begin ramping up.

With the present disclosure, operation of the steam turbine system of FIG. 3 can begin much earlier as compared to the system of FIG. 2. As indicated by curve 94', steam turbine 26 can begin rotating at a time soon after gas turbine 20A, 20B begins rotating by using power from grid 14 to operate generator 28 as a starter-motor (with power from the grid 14 processed by frequency converter 58). As such, curve 94 can become shifted a period of time (shown by arrow 98) to represent initiation of steam turbine 26 operation much closer to the commencement of operation of gas turbine 20A, 20B. A rub check can be performed at point 5E in a similar manner as performed at point 5B. Because steam turbine 26 has begun rotating, it becomes possible to load steam turbine 26 much earlier, as indicated by curve 96'. As such, curve 96 can become shifted a period of time (shown by arrow 99) to represent loading of steam turbine 26 much sooner. In order to initiate loading of steam turbine 26, a heat soak typically needs to be performed. A heat soak can be performed at point 5F. However, because the HRSG, e.g., HRSGs 18A and 18B, will typically not be operational at that point due to the gas turbine having just recently begun loading, the heat to perform the heat soak may be provided using a separate heat source. For example, steam from auxiliary boiler 52 can be introduced into steam turbine 26 by opening shut-off valve 59.

Steam turbine 26 can therefore become operational much earlier, making power from electrical generator 28 coupled thereto available earlier. Additionally, gas turbine 20A, 20B can be brought up to full load earlier, thereby reducing emissions output related to operation of gas turbine 20A, 20B at less efficient, part-load operations.

Figure 6:
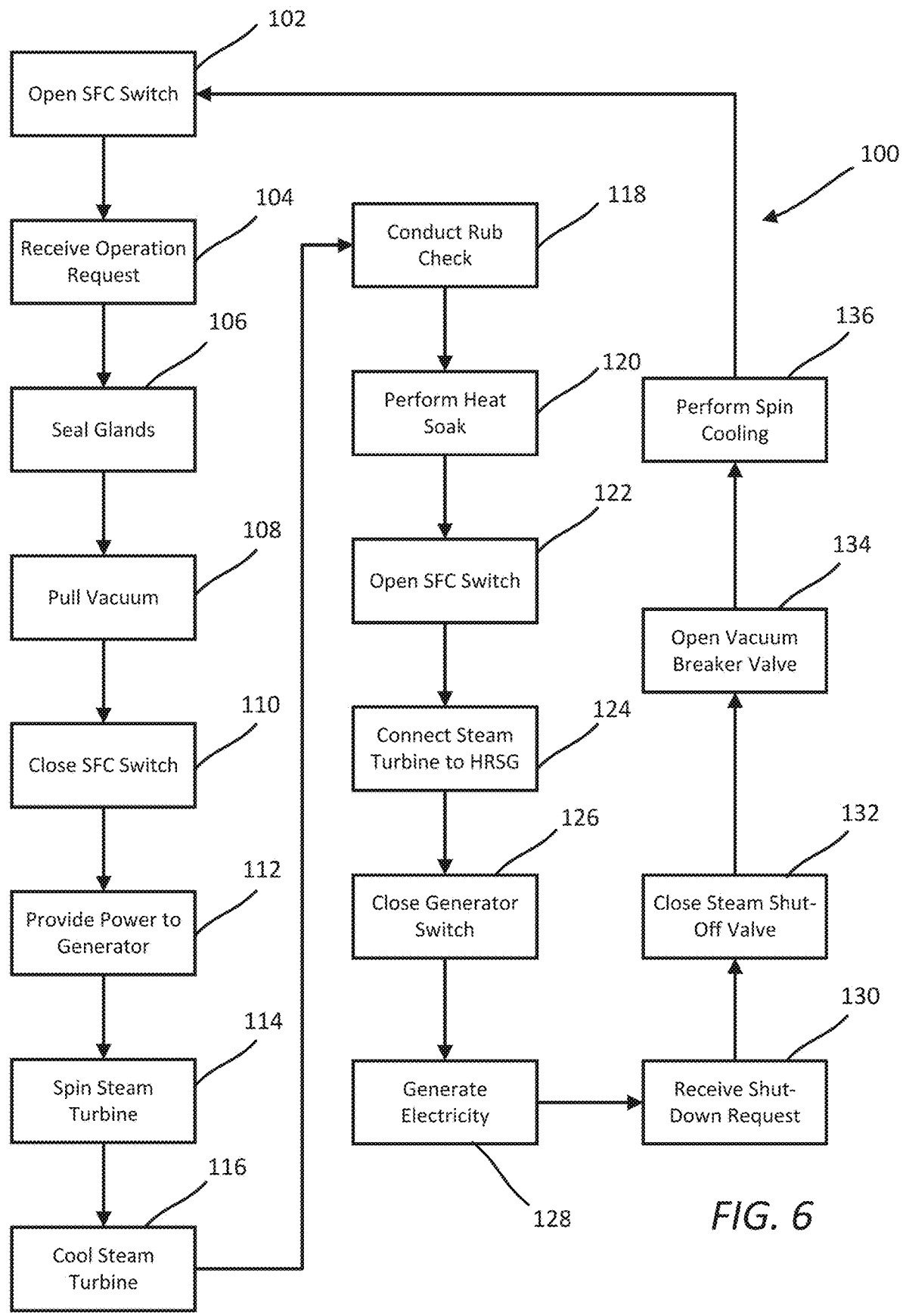
FIG. 6 is a schematic diagram illustrating methods for starting steam turbines according the present disclosure.

FIG. 6 is a line diagram illustrating method 100 for starting steam turbine 26 according the present disclosure.

At step 102, switches 56A and 56B can be opened such that generator unit 28 is in a powered-down or off configuration where shaft 54 of steam turbine 26 is not rotating.

At step 104, controller 24A for gas turbine 20A can receive a start instruction from controller 19 of power plant 12A, such as after grid controller 15 instructs controller 19 of power plant 12A to come on-line. Controller 19 can also issue corresponding instructions to steam turbine 26 to begin operations.

At step 106, glands of steam turbine 26 can be sealed through use of steam from auxiliary boiler 52, or another source. Steam can be routed toward shaft 54 via steam line 51. As discussed, labyrinth seals can be provided with steam from auxiliary boiler 52 to wet the seals to facilitate sealing functionality. Sealing of steam turbine 26 can allow for the creation of a controlled environment within steam turbine 26.

At step 108, a vacuum can be pulled in steam turbine 26. Air can be evacuated from within steam turbine 26 using vacuum pumps and/or steam ejectors or other appropriate means. Removal of the air reduces friction against blades and vanes of the steam turbine, thereby reducing heat during rotation before steam is introduced into steam turbine 26. Sealing of the gland seals can prevent air from leaking back into steam turbine 26.

At step 110, controller 19 can close switch 56A to put frequency converter 58 in communication with grid 14.

At step 112, power from grid 14 can be directed to frequency converter 58 through switch 56A. The power, e.g., the electrical current, can flow to electric generator 28. As such, generator 28 can begin to operate as a starter-motor and spin shaft 54.

At step 114, rotational power from shaft 54 can be transferred to and begin to spin steam turbine 26. Power can be continuously delivered to generator 28 at an increasing frequency until steam turbine 26 is adequately prepared to be loaded and drive generator 28.

At step 116, steam turbine 26 can be cooled, Spinning of steam turbine 26 via generator 28 can produce churning of air within steam turbine 26, the friction and pressure from which can result in undesirable heating of the blades of steam turbine 26. The churning can prematurely heat steam turbine 26 before conventional cooling methods, e.g., steam from HRSGs 18A and 18B, are available to maintain steam turbine 26 at suitable temperatures. As such, steam from auxiliary boiler 52 can be introduced into steam turbine 26.

At step 118, a rub check can be performed, As discussed, components of steam turbine 26 can be inspected while rotating at a low speed that will avoid any component interference or damage from misalignment. Any component misalignment or interference can be corrected before steam turbine 26 is permitted to increase rotational speed.

At step 120, a heat soak can be performed. As discussed, it can be desirable to slowly and uniformly bring the temperate of steam turbine 26 up to operational temperatures. As such, steam from auxiliary boiler 52 can be introduced into areas of steam turbine 26 outside of the main steam path to bring components into those areas up to temperature. Heat soak operations using steam from auxiliary boiler 52 can be combined with air-churn cooling to provide the appropriate level of heating and cooling to different parts of steam turbine 26.

As such, electrical generator 26 can continuously spin steam turbine 26 until HRSGs 18A and 18B (FIG. 1) is ready to provide the desired steam to steam turbine 26 to sustain operation. Auxiliary boiler 52 can continue to provide steam to seals, the turbine blades and other areas of steam turbine 26 to provide gland seal wetting, chum-cooling and heat soak functions to steam turbine 26, respectively.

At step 122, switch 56A can be opened to prepare steam turbine 26 for receiving steam from HRSGS 18A and 18B and stop generator 28 from continuing to drive shaft 54.

At step 124, steam turbine 26 can be connected to gas G of HRSGs 18A and 18B when steam turbine 26 is rotating shaft 54 at a sufficient speed to drive generator 28, resulting from the initial spinning-up of shaft 54 from generator 28. As such, generator 28 ceases to operate as a starter-motor and converts to being driven by shaft 54 to operate as an electricity generator.

At step 126, switch 56B can be closed such that power from generator 28 can be delivered to grid 14 at the grid frequency through transformer 50 and switch 56B. In examples, switch 56B can be closed simultaneously as switch 56A is opened.

At step 128, operation of steam turbine 26 can be maintained to deliver power to grid. 14. Operation of steam turbine 26 can be maintained until controller 19 receives an instruction to the contrary, e.g., to stop generating electricity, from, for example, controller 15.

At step 130, controller 19 can receive an instruction from controller 15 to cease contributing power to grid 14. The stop can occur immediately or at a subsequent time that is determined in advance. Additionally, controller 19 can stop operation without a specific instruction from grid controller 19 such as at a predetermined, scheduled stop time or manually at a user interface. To begin stoppage of steam turbine 26, controller 19 can issue instructions to the various components of steam turbine 26 to cease operation, such as to open switch 56B. Furthermore, additional steps can be taken to cool steam turbine 26 during the wind down process.

At step 132, a steam shut-off valve can be closed. For example, main shut-off valve 59 can be closed to prevent or control additional steam from flowing into steam turbine 26, Operation of valve 59 can prepare steam turbine 26 for a shut-down, a warm start and a hot start.

Typically, between normal stop and restarts (hot and warm starts), steam turbine 26 can be maintained hot to allow for a quick start. As such, even though steam turbine 26 is not operating to generate electricity, it can be maintained in a heated state with steam in anticipation of an upcoming restart. However, sometimes it is desirable to fully shut-down steam turbine 26, such as to perform maintenance.

At step 134, a vacuum breaker valve can be opened to prepare steam turbine 26 for spin cooling operations. A vacuum breaker valve can be located fluidly downstream of steam turbine 26. Opening of the vacuum breaker valve can allow air to flow into steam turbine 26.

At step 136, when maintenance or repair work is to be done on the steam turbine after a stoppage, there can be a long wait to get steam turbine cooled to gain human access. Metal temperature of the steam turbine decreases very slowly as it is heavily insulated and there is no forced cooling. In some cases, waiting time could be in days. To reduce this waiting time, spin cooling of steam turbine 26 can be applied, with suitable design provisions. Switch 56A can be closed to provide power from grid 14 to frequency converter 58. As such, generator 28 can operate as a motor to rotate shaft 54 of steam turbine 26. Rotation or spinning of steam turbine 26 without the presence of steam in steam turbine 26 can push air past the steam turbine blades to cool steam turbine 26 as the vacuum breaker valve is kept open during spin cooling.

In examples, method 100 can return to step 102 where both switches 56A and 56B are open, steam turbine 26 is not rotating, and electricity is not being produced at generator 28. As such, controller 19 can then be in a standby mode waiting for an instruction from controller 15 to begin operation or waiting for a scheduled start time.

The installation and operational benefit of the systems and methods of the present disclosure can be in the form of, for example, 1) a decrease in start times for a steam turbine with associated potential to bring steam turbine electricity on-line sooner, 2) a decrease in start times for combined-cycle gas turbines with associated potential to bring gas turbine electricity on-line sooner, 3) reduced emissions from bringing the gas turbines up to more efficient loaded capacity sooner, 4) overall reduction in start-time for a combined-cycle power plant with the associated potential to bring power to the grid sooner, thereby allowing earlier monetization of a power plant, and 5) possible reduction in access time during outages due to spin cooling.

Various Notes

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventor also contemplates examples in which only those elements shown or described are provided. Moreover, the present inventor also contemplates examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37

C.F.R. §1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The claimed invention is:

1. A power plant system comprising:
   a steam turbine;
   a generator configured to be driven by the steam turbine to supply power to a grid system;
   a first switch to electrically couple and decouple the generator from the grid system;
   a frequency converter electrically coupled to the generator;
   a second switch to electrically couple and decouple the frequency converter from the grid system;
   a heat recovery steam generator; and
   a power plant controller configured to:
      control the first switch to electrically couple and decouple the generator from the grid system; and
      control the second switch to electrically couple and decouple the frequency converter from the grid system;
   wherein the controller is configured to:
      open the first switch and close the second switch to spin the steam turbine with power from the grid through the frequency converter before the heat recovery steam generator is operating to provide steam to the steam turbine; and
      close the first switch and open the second switch to provide power from the generator to the grid system when the heat recovery steam generator is operating to provide steam to the steam turbine.

2. The system of claim 1, further comprising an auxiliary boiler coupled to the steam turbine.

3. The system of claim 2, further comprising conduit for connecting the auxiliary boiler to seals of the steam turbine.

4. The system of claim 2, wherein:
   the heat recovery steam generator is coupled to the steam turbine and the auxiliary boiler; and
   the controller is configured to operate the system to provide steam from the auxiliary boiler to the steam turbine before the heat recover steam generator is operating to generate steam and while the frequency converter is operating the generator to spin the steam turbine.

5. The system of claim 4, further comprising a breaker valve for the steam turbine to prevent pressure build-up.

6. The system of claim 4, further comprising:
   a gas turbine engine; and
   an electrical generator coupled to the gas turbine engine;
   wherein exhaust gas of the gas turbine engine is configured to be routed to the heat recovery steam generator; and
   wherein the controller is configured to operate the system to provide steam from the heat recovery steam generator to the steam turbine after the gas turbine engine is operating and while the frequency converter is not operating the generator to spin the steam turbine.

7. The system of claim 1, further comprising a gas turbine engine controller in communication with the power plant controller, the power plant controller configured to coordinate operation of the first and second switches with operation of the gas turbine engine such that the first switch is opened and the second switch is closed when the gas turbine engine is ignited.

8. The system of claim 1, wherein the frequency converter comprises a static frequency converter or a load commutated inverter.

9. The system of claim 1, further comprising a transformer positioned between the generator and the first switch.

10. The system of claim 4, wherein the controller is further configured to:
    disconnect the steam turbine from steam of the heat recovery steam generator; and
    spin cool the steam turbine using the frequency converter to drive the generator as a motor.

* * * * *